(12) United States Patent
Koeneman

(10) Patent No.: US 7,371,052 B2
(45) Date of Patent: *May 13, 2008

(54) EMBEDDED FLUID MIXING DEVICE USING A HOMOPOLAR MOTOR

(75) Inventor: Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/919,464

(22) Filed: Aug. 16, 2004

(65) Prior Publication Data

US 2006/0034149 A1 Feb. 16, 2006

(51) Int. Cl.
*F04B 17/00* (2006.01)
*F04B 35/04* (2006.01)
*B01F 13/08* (2006.01)

(52) U.S. Cl. ............ 417/53; 366/273; 366/348; 366/601; 417/423.1; 417/423.7; 310/178

(58) Field of Classification Search .......... 366/273, 366/348, 601; 310/178; 417/53, 423.1, 417/423.7
See application file for complete search history.

(56) References Cited

U.S. PATENT DOCUMENTS

| | | | | |
|---|---|---|---|---|
| 2,914,688 | A | * | 11/1959 | Matthews ............ 310/178 |
| 3,090,875 | A | * | 5/1963 | Harkness ............ 310/306 |
| 3,205,384 | A | * | 9/1965 | Sears ............ 310/168 |
| 3,217,199 | A | * | 11/1965 | Musset ............ 310/178 |
| 3,548,231 | A | * | 12/1970 | MacNab ............ 310/178 |
| 3,678,306 | A | * | 7/1972 | Garnier et al. ............ 310/11 |
| 3,705,775 | A | * | 12/1972 | Rioux ............ 417/411 |
| 5,783,879 | A | | 7/1998 | Furlani et al. |
| 5,821,659 | A | | 10/1998 | Smith |
| 5,822,839 | A | | 10/1998 | Ghosh et al. |
| 5,932,940 | A | | 8/1999 | Epstein et al. |
| 6,086,243 | A | | 7/2000 | Paul et al. |
| 6,493,224 | B1 | | 12/2002 | Mottahed |
| 6,530,217 | B1 | | 3/2003 | Yokota et al. |
| 6,590,370 | B1 | | 7/2003 | Leach |
| 6,628,522 | B2 | | 9/2003 | Trautman et al. |
| 6,655,923 | B1 | | 12/2003 | Lisec et al. |
| 6,666,658 | B2 | | 12/2003 | Takeuci et al. |
| 6,756,708 | B2 | | 6/2004 | Koeneman |
| 6,770,997 | B2 | | 8/2004 | Koeneman |

(Continued)

OTHER PUBLICATIONS

U.S. Appl. No. 10/942,539, filed Sep. 16, 2004, Koeneman.

*Primary Examiner*—Tony G Soohoo
(74) *Attorney, Agent, or Firm*—Darby & Darby; Robert J. Sacco

(57) ABSTRACT

A fluid displacement device (100) having a homopolar motor (110). The homopolar motor includes a rotatable disk (115) with at least one fluid displacement structure (120) disposed thereon. The fluid displacement structure can be a blade. The rotatable disk can be disposed within a cavity (145) defined in a substrate (105), such as a ceramic substrate, a liquid crystal polymer substrate, or a semiconductor substrate. A closed loop control circuit (235) can be included to control the rotational speed of the rotatable disk. For example, the control circuit can control a voltage source or a current source that applies voltage across the rotatable disk. The control circuit also can control a strength of a magnet (210) that applies a magnetic field (205) substantially aligned with an axis or rotation (155) of the rotatable disk.

10 Claims, 7 Drawing Sheets

U.S. PATENT DOCUMENTS

| | | |
|---|---|---|
| 7,093,818 B2 * | 8/2006 | Koeneman ................. 251/208 |
| 2004/0095031 A1 | 5/2004 | Koeneman |
| 2006/0057004 A1 * | 3/2006 | Koeneman ............... 417/423.1 |

* cited by examiner

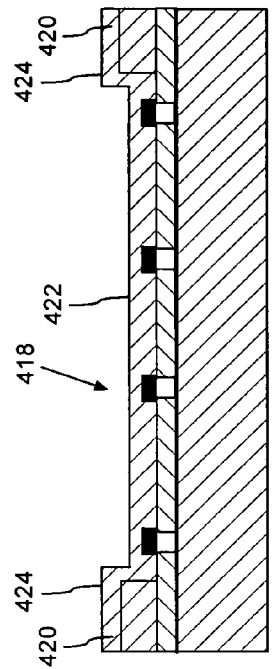
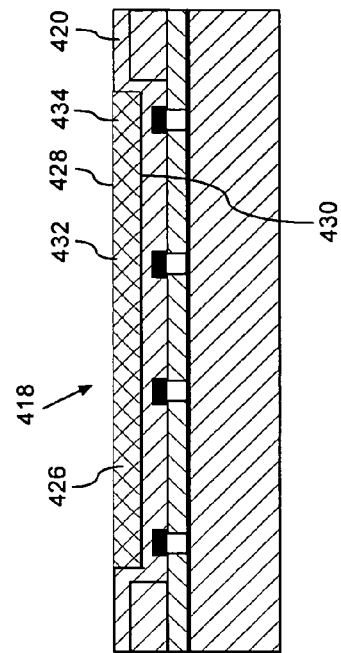
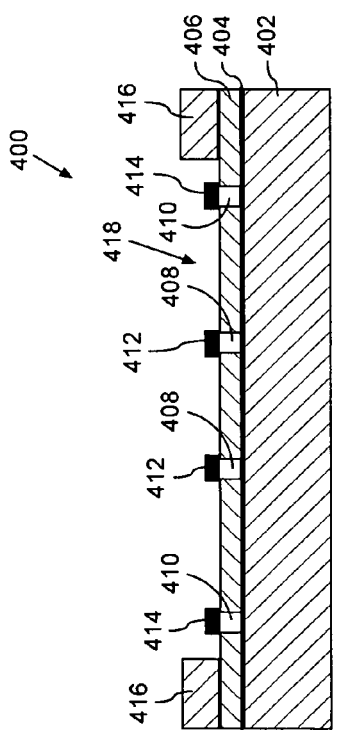
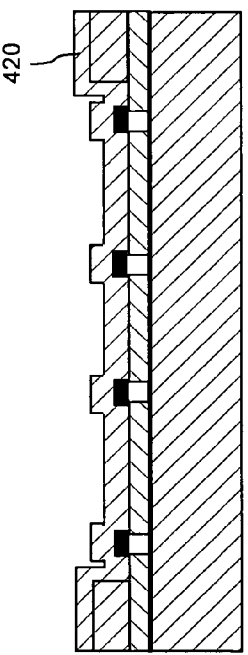
Fig. 4A
Fig. 4B
Fig. 4C
Fig. 4D

EMBEDDED FLUID MIXING DEVICE USING A HOMOPOLAR MOTOR

BACKGROUND OF THE INVENTION

1. Statement of the Technical Field

The inventive arrangements relate generally to the field of micro electromechanical system (MEMS) devices.

2. Description of the Related Art

As technology progresses, clock speeds of modern electronic devices continue to increase, resulting in a greater amount of heat being produced by device components. Additionally, efforts are currently under way to adapt very small fuel cells, called microcells, into portable electronic devices. For example, it is anticipated that microcells soon will be used for powering laptop computers and cell phones. Microcells generate heat, though, thus adding to the total amount of heat that will be generated by such electronic devices. Meanwhile, circuit geometries and device packaging continue to shrink. Hence, modern circuit designers face many design challenges concerning thermal management.

Fans are a frequently used solution to dissipate heat within electronic devices. However, such fans tend to be rather bulky, occupying valuable space within the devices. Moreover, the fans often prove to be less than reliable, sometimes failing prior to any other device components. In some instances, the loss of heat dissipation resulting from the failure of a fan actually causes other device components to overheat and fail. Accordingly, a small, yet reliable thermal management solution is needed to dissipate heat in modern electronic devices.

SUMMARY OF THE INVENTION

The present invention relates to a fluid displacement device having a homopolar motor. The homopolar motor includes a rotatable disk with at least one fluid displacement structure disposed thereon, for example a blade. The rotatable disk can be at least partially disposed within a cavity defined in a substrate, such as a ceramic substrate, a liquid crystal polymer substrate, or a semiconductor substrate. A closed loop control circuit can be included to control the rotational speed of the rotatable disk. For example, the control circuit can control a voltage source or a current source that applies voltage across the rotatable disk. The control circuit also can control a strength of a magnet that applies a magnetic field substantially aligned with an axis or rotation of the rotatable disk.

Voltage can be applied across a central portion and a radial edge portion of the rotatable disk in the presence of a magnetic field substantially aligned with an axis of rotation of the rotatable disk. The rotatable disk can have at least one fluid displacement member disposed thereon, for example a blade. The rotational speed of the rotatable disk can be selectively controlled to vary a fluid displacement rate. For example, the control circuit can control a voltage source or a current source that applies voltage across the rotatable disk. The control circuit also can control the strength of the magnetic field.

BRIEF DESCRIPTION OF THE DRAWINGS

FIGS. 4A-4I illustrate a process for manufacturing the fluid mixer on a semiconductor substrate, which is useful for understanding the present invention.

DETAILED DESCRIPTION OF THE PREFERRED EMBODIMENTS

The present invention relates to a fluid displacement device (fluid mixer) embedded within a substrate. Accordingly, the fluid mixer can be manufactured as a micro electromechanical system (MEMS) device. The fluid mixer can be embedded proximate to thermal generating devices and used to enhance the flow of convection currents around the devices, thereby providing a low profile solution for improving device heat dissipation. Accordingly, the use of bulky cooling fans which otherwise might be needed can be avoided. In another arrangement, the fluid mixer can be embedded within a substrate of a microfluidic system to mix fluids. Thus, the use of external mixing devices can be avoided.

The fluid mixer can be a stand alone device or can be advantageously integrated within a larger system. Examples of such larger systems can include electronic devices, fuel cells, fluidic systems, or any other device having a substrate. Importantly, the invention is not limited to any particular type of device.

Figure 1:
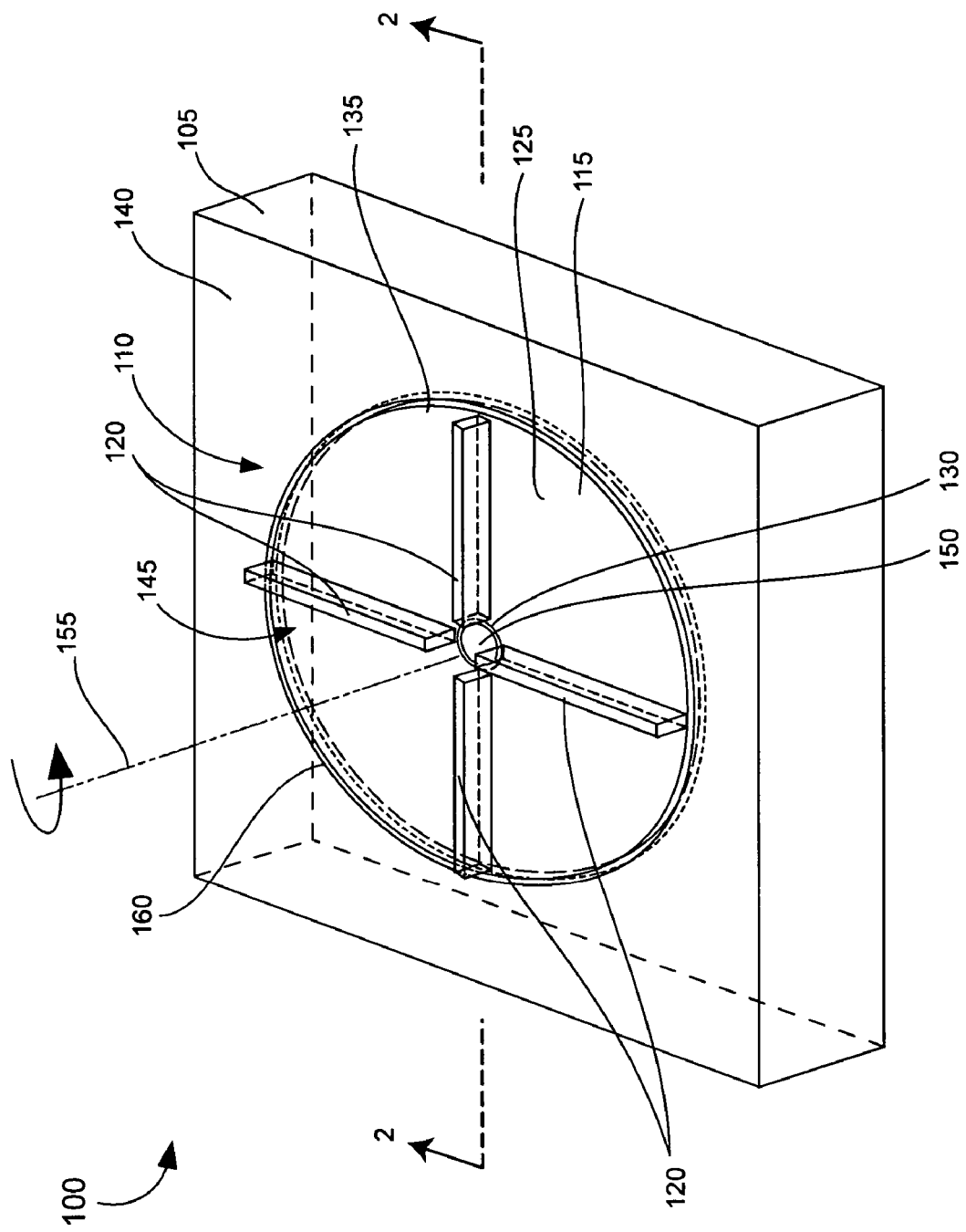
FIG. 1 is a perspective view of a fluid mixer that is useful for understanding the present invention.

Referring to FIG. 1, a perspective view of a fluid mixer 100 in accordance with the present invention is shown. The fluid mixer 100 can be manufactured on a substrate 105, which can be any of a variety of substrates. For example, the fluid mixer 100 can be manufactured on a substrate made of liquid crystal polymer (LCP), ceramic, silicon, gallium arsenide, gallium nitride, germanium or indium phosphide. Still, the invention is not so limited and any substrate material suitable for a microelectromechanical manufacturing process can be used.

The fluid mixer 100 can include a microelectromechanical homopolar motor (homopolar motor) 110 having a conductive rotatable disk (disk) 115. At least one fluid displacement structure can be disposed on the disk 115. The fluid displacement structure can be any structure that can be moved by the disk 115 and that is suitable for displacing fluids. For example, fluid displacement structures (blades) 120 can be disposed on the rotatable disk 115 such that the blades 120 mix fluid as the disk 115 rotates. For instance, the blades 120 can extend upwards from an upper surface 125 of the disk 115. The blades 120 can be integrally formed on the disk 115 or attached to the disk via glue, fasteners, a weld, or any other suitable attachment means. The blades 120 can extend from a central portion 130 of the disk 115 to an outer peripheral region 135 of the disk 115. In one arrangement the blades 120 can extend radially from the central portion 130 of the disk 115 in a linear fashion. However, the invention is not so limited. For example, the blades 120 can be curved, angled, or have any other desired shape. Moreover, fluid displacement structures having complex mechanical configurations can be provided. For instance, the blades 120 can include a plurality of curved and/or angled portions configured to optimize fluid displacement in the application for which the fluid mixer 100 will be used.

In addition to the blades 120, or in lieu of the blades 120, other types of fluid displacement structures also can be provided. For instance, the fluid displacement structures can comprise a plurality of corrugations and/or raised nubs disposed on the upper surface 125 of the disk 115. Still, there are many other types of fluid displacement structures that can be used and the invention is not so limited.

The disk 115 can be positioned proximate to a surface 140 of the substrate 105, for example within a cavity 145 defined within a substrate 105. Importantly, the cavity 145 can have a shape that is substantially circular, square, rectangular, or any other desired shape. Nevertheless, it should be noted that a cavity is not required to practice the present invention. For instance, the disk 115 can be disposed above the surface 140 of the substrate 105.

In one arrangement, the disk 115 can be provided with an axle 150 to facilitate rotation about the central axis 155 of the disk 115 and maintain the disk 115 in the proper operating position. Nevertheless, other arrangements can be provided as well. For example, in another arrangement the cavity 145 can be structured with a low friction peripheral surface 160 that maintains the disk 115 within the cavity 145. In yet another arrangement, a hole can be provided at the central axis 155 of the disk 115. The hole can fit over a cylindrical structure, such as a bearing, to maintain the operating position of the disk 115.

In operation, rotation of the disk 115 rotates the fluid displacement structure, such as blades 120, about the central axis 155, moving the blades 120 through a fluid medium. Accordingly, the blades 120 can cause fluid to be displaced. For example, movement of the blades 120 can promote mixing of two or more fluids. Movement of the blades 120 also can disrupt boundary layer fluid flow over a surface, thereby enhancing convection heat transfer.

Figure 2:
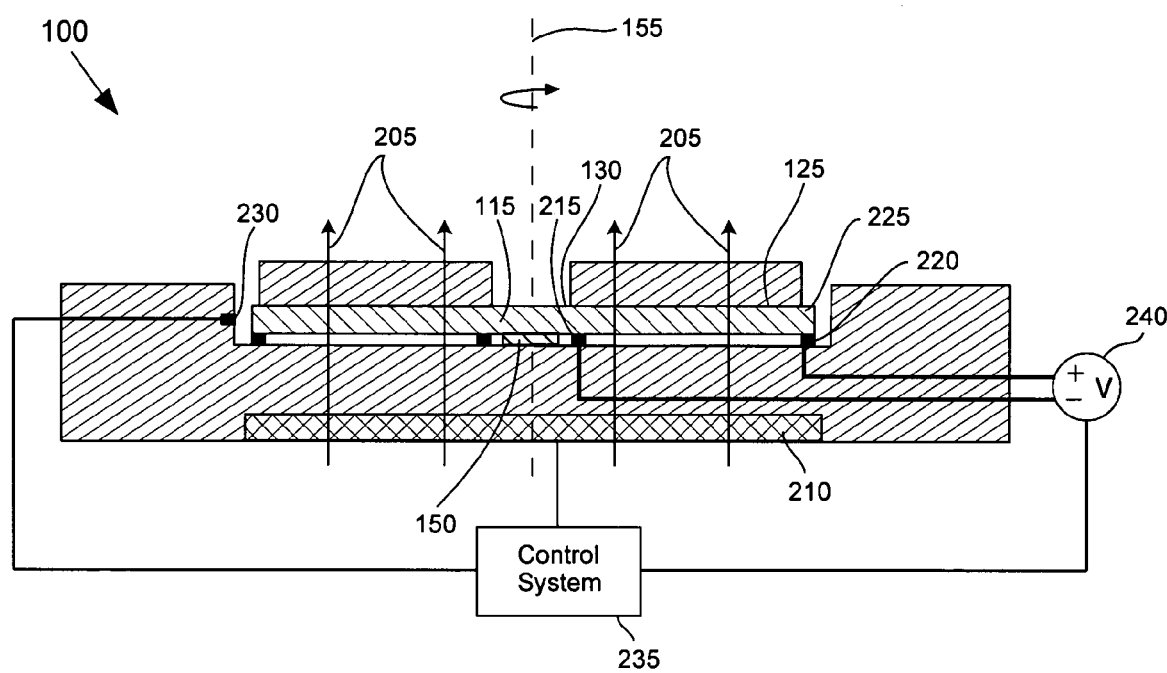
FIG. 2 is a section view of the fluid mixer of FIG. 1 taken along section line 2-2.

Referring to FIG. 2, a cross section is shown of the fluid mixer 100 of FIG. 1 taken along section line 2-2. The rotatable disk 115 is immersed in a magnetic field, illustrated with magnetic field lines 205, which are typically perpendicular to the surface 125 of the disk 115 and aligned with the axis of rotation 155 of the disk. One or more magnets 210 can be provided above and/or below the disk 115 to generate the magnetic field 205. The magnets 210 can include permanent magnets and/or electromagnets.

A first contact brush 215 can contact the disk 115 near its central portion 130, which is proximate to the disk central axis 155. A second contact brush 220, which can be radially spaced from the first contact brush 215 to contact the radial edge portion 225 of the disk 115. The second contact brush 220 can contact the radial edge portion 225 at a single point, or circumferentially extend under or around the entire radial edge portion 225.

In one arrangement, a contact brush (not shown) can be provided to contact the axle 150. Additional contact brushes also can be provided. For example, contact brushes can be spaced in a circular pattern to contact multiple points on the radial edge portion 225. Similarly, contact brushes can be spaced near the central portion 130 of the disk 115 to contact the central portion 130 at multiple points, to form a continuous circumferential contact surface at the central portion 130, or to contact the axle 150.

When voltage is applied across the contact brushes 215 and 220, causing current to flow through the disk 115, magnetic forces are exerted on the moving charges. The moving charges in turn exert the force to the disk 115, thereby causing the disk 115 to rotate. Notably, the direction of rotation depends on the direction of the current flow through the disk 115, for example, whether the current flows from the central portion 130 of the disk 115 to the radial edge portion 225, and vice versa. Accordingly, the polarity of the applied voltage can be changed when it is desired to change the direction of rotation of the conducive disk 115.

Further, a sensor 230 can be provided for monitoring the rotational speed of the disk 115. For instance, the sensor 230 can be operatively connected to a closed loop control system 235 which controls the rotational speed. Such sensors are known to the skilled artisan. For example, the sensor can be an optical sensor which reads one or more marks on the disk 115 as the disk 115 rotates. In another arrangement, the sensor can generate a signal each time a blade passes the sensor as the disk rotates. The time period between sequential mark readings (or blades passing the sensor) can be measured and correlated to the rotational speed of the disk 115. Still, there are a myriad of other sensors known to the skilled artisan that can be used to measure or derive the rotational speed of the disk, and the invention is not so limited.

Regardless of how rotational speed is determined, the control system 235 can control the rotational speed of the disk 115 by controlling a voltage and/or current source 240 that applies voltage to the disk 115. The control system 235 also can control the rotational speed by controlling the field strength 205 of the magnets 210. For instance, in the case that the magnet 210 comprises an electromagnet, electric current through the electromagnet can be adjusted.

Figure 3A:
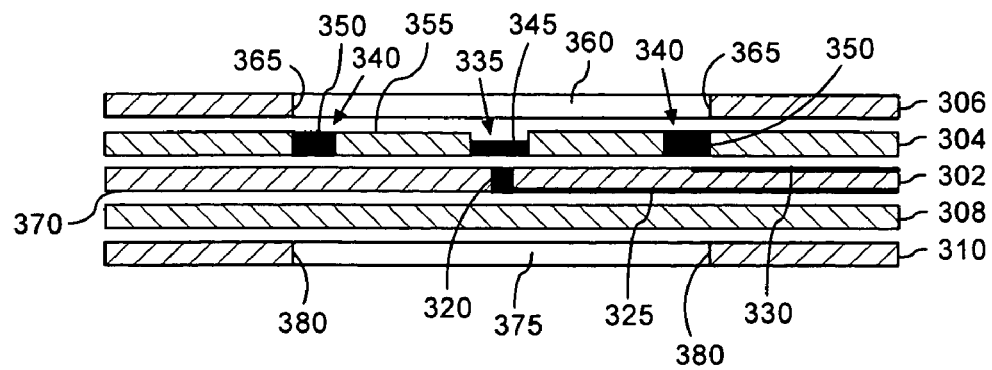
FIGS. 3A-3C illustrate a process for manufacturing the fluid mixer on a dielectric substrate, which is useful for understanding the present invention.
Figure 3B:
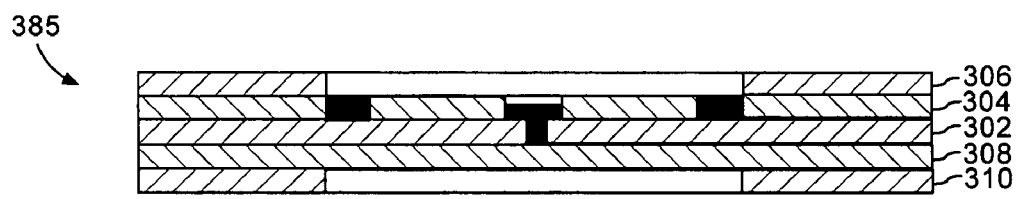
Figure 3C:
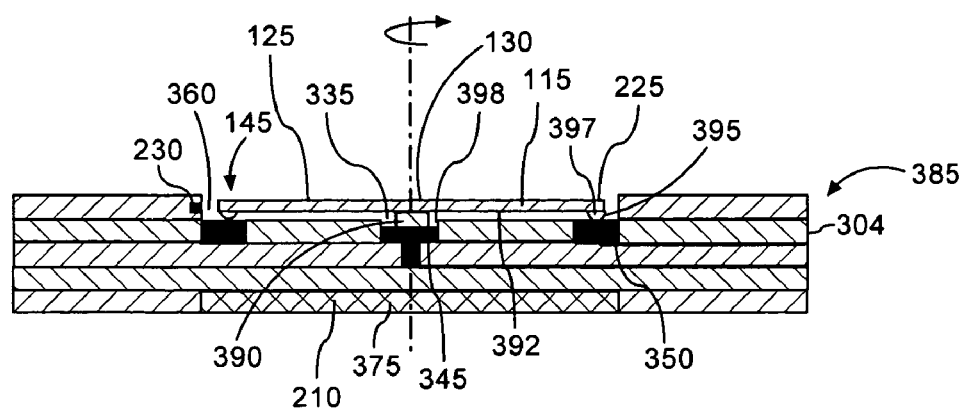

FIGS. 3A-3C represent one manufacturing process that can be used for manufacturing the fluid mixer on a ceramic substrate. Nevertheless, it should be noted that the structures represented in FIGS. 3A-3C also can be implemented for manufacturing the fluid mixer with other types of substrates, for example with LCP substrates. It should be noted, however, that the lamination and curing processes can differ for each type of substrate, as would be known to the skilled artisan.

One LCP substrate that can be used is R/flex® 3000 Series LCP Circuit Material available from Rogers Corporation of Rogers, Conn. The R/flex® 3000 LCP has a low loss tangent and low moisture absorption, and maintains stable electrical, mechanical and dimensional properties. The R/flex® 3000 LCP is available in a standard thickness of 50 μm, but can be provided in other thicknesses as well.

One ceramic substrate that can be used is low temperature 951 co-fire Green TapeTM from Dupont®. The 951 co-fire Green Tape™ is Au and Ag compatible, and has acceptable mechanical properties with regard to thermal coefficient of expansion (TCE) and relative strength. It is available in thicknesses ranging from 114 μm to 254 μm. Other similar types of systems include a material known as CT2000 from W. C. Heraeus GmbH, and A6S type LTCC from Ferro Electronic Materials of Vista, Calif. Any of these materials, as well as a variety of other LTCC materials with varying electrical properties can be used.

Referring to FIG. 3A, a first substrate layer 302 can be provided. The substrate material that is to be used in each of the substrate layers can be preconditioned before being used in a fabrication process. For example, if the substrate is ceramic, the ceramic material can be baked at an appropriate temperature for a specified period of time or left to stand in a nitrogen dry box for a specified period of time. Common preconditioning cycles are 160° C. for 20-30 minutes or 24 hours in a nitrogen dry box. Both preconditioning process are well known in the art of ceramic substrates.

Once the first substrate layer 302 is preconditioned, a conductive via 320 can be formed in the first substrate layer 302 to provide electrical conductivity through the substrate layer. Many techniques are available for forming conductive vias in a substrate. For example, vias can be formed by mechanically punching holes or laser cutting holes into the substrate. The holes then can be filled with a conductive material, such as a conventional thick film screen printer or extrusion via filler. Vacuum can be applied to the first substrate layer 302 through a porous stone to aid via filling. Once the conductive via 320 has been formed in the first substrate layer 302, the conductive material can be dried in a box oven at an appropriate temperature and for an appropriate amount of time. For example, a common drying process is to bake the ceramic substrate having the conductive material at 160° C. for 5 minutes.

After the conductive filler in the via has dried, a first conductive circuit trace 325 and a second conductive circuit trace 330 can be provided. The circuit traces 325, 330 can be deposited onto the first substrate layer 302 using a conventional thick film screen printer, for example, standard emulsion thick film screens. In one arrangement, the circuit traces 325, 330 can be deposited onto opposite sides of the first substrate layer 302, with the first circuit trace 325 being in electrical contact with the conductive via 320. The second circuit trace 330 can extend around, and be concentric with, the conductive via 320. Nonetheless, a myriad of other circuit layouts can be provided, as would be known to the skilled artisan. As with the via filling process, once the circuit traces have been applied to the first substrate layer 302, the circuit traces can be dried in a box oven at an appropriate temperature and for an appropriate amount of time.

Subsequent substrate layers can be laminated to the first substrate layer 302 after appropriate preconditioning and drying of the circuit traces and/or via fillers. In particular, a second substrate layer 304 can be stacked onto the first substrate layer 302. The second layer 304 can insulate circuit traces on the top of the first substrate layer 302. The second substrate layer also can include vias 335, 340, which can be filled with material to form an axial contact brush 345 and at least one radial contact brush 350, respectively. The vias can be positioned so that the contact brushes are electrically continuous with respective circuit traces 325, 330. In one arrangement, a plurality of radial contact brushes 350 or a continuous radial edge contact brush can be disposed concentric with, and at a uniform radius from, the axial contact brush 345 to reduce a net contact resistance between the conductive object and the brushes.

The contact brushes can include any conductive material suitable for use in a contact brush, for example a conductive epoxy, conductive polymer, carbon nano composite or a conductive liquid. In the case that the contact brushes are a solid material, such as carbon nano composite, the contact brushes can be screen printed into the vias in the second substrate layer 304 using a conventional thick film screen printer. In the case that a conductive liquid is used as contact brushes, ferromagnetic properties can be incorporated into the conductive liquid so that a magnetic field can contain the conductive liquid within the vias 335, 340. In one arrangement, the axial contact brush 345 can fill only part of the via 335 so that a top surface of the contact brush 345 is disposed below an upper surface 355 of the second substrate layer 304. Accordingly, the via 335 also can function as a bearing.

A third substrate layer 306 can be stacked above the second substrate layer 304. The third substrate layer 306 can incorporate an aperture 360 having a radius edge 365 aligned with an outer radius of vias 350 (a portion of each via furthest from the via 335). A fourth substrate layer 308 can be stacked below the first substrate layer 302 to insulate circuit traces on the lower surface 370 of the first substrate layer 302. Further, a fifth substrate layer 310 can be stacked below the fourth substrate layer 308. The fifth substrate layer 310 also can include an aperture 375 having an outer radius 380.

In some instances it can also be desirable to include a conductive ground plane (not shown) on at least one side of one or more of the substrate layers 302, 304, 306, 308, 310. For example, the ground plane can be used in those instances where RF circuitry is formed on the surface of a substrate layer. The conductive ground plane also can be used for shielding components from exposure to RF and for a wide variety of other purposes. The conductive metal ground plane can be formed of a conductive metal that is compatible with the substrate. Still, those skilled in the art will appreciate that the ground plane is not required for the purposes of the invention.

Referring to FIG. 3B, the first five layers 302, 304, 306, 308, 310 can be stacked to form a substrate structure 385. Importantly, it should be noted that the layer scheme presented herein is by example only. A greater number or a fewer number of substrate layers also can be used. Notably, each of the substrate layers can further comprise multiple sub layers which have been stacked to form each layer.

Once the substrate layers have been stacked to form the substrate structure 385, the structure 385 can be laminated using a variety of lamination methods. In one method, the substrate layers can be stacked and hydraulically pressed with heated platens. For example, a uniaxial lamination method presses the substrate layers together at 3000 psi for 10 minutes using plates heated to 70° C. The substrate layers can be rotated 165° following the first 5 minutes. In an isotatic lamination process, the substrate layers are vacuum sealed in a plastic bag and then pressed using heated water. The time, temperature and pressure can be the same as those used in the uniaxial lamination process; however, rotation after 5 minutes is not required. Once laminated, the structure 385 can be fired inside a kiln on a flat tile. For example, the substrate layers can be baked between 200° C. and 500° C. for one hour and a peak temperature between 850° and 875° can be applied for greater than 15 minutes. After the firing process, post fire operations can be performed on the substrate layers.

Referring to FIG. 3C, the disk 115 can be provided within the cavity 145, formed by aperture 360. The disk 115 can comprise a conductive material, such as aluminum, copper, brass, silver, gold, steel, stainless steel, or any other rigid conductive material. In another arrangement, the disk 115 can comprise a plurality of materials, for example a semi-rigid conductive material that is laminated to a rigid material, for instance ceramic. The disk 115 can include a central contact 390 axially located on the lower surface 392, and at least one radial contact 395, also located on the lower surface 392. In one arrangement, the radial contact 395 can extend around the lower peripheral region 397 of the disk 115. The disk 115 can be positioned above the second substrate layer 304 so that the central contact 390 makes electrical contact with the axial contact brush 345 and the radial contact 395 makes electrical contact with the radial edge contact brush 350. Accordingly, electrical current can flow between the central portion 130 of the disk and radial edge portion 225 when voltage is applied across the contact brushes 345, 350. A radial wall 398 of the via 335 can function as a bearing surface for the central contact 390 of the disk 115. Alternatively, bearings (not shown) can be installed between the radial wall 398 and the central contact 390. The bearings can be, for example, electromagnetic or electrostatic bearings.

As noted, a sensor 230 can be provided for use in a control circuit for controlling operation of the disk 115. The sensor 230 can be disposed in any location suitable for measuring rotational speed of the disk 115. Circuit traces can be provided as required for propagating sensor data, as would be known to the skilled artisan.

One or more magnets can be fixed above and/or below the disk 115 to provide the magnetic field aligned with an axis of rotation of the disk 115. For example, a magnet 210 can be attached to the bottom of the substrate structure 385, for example in the aperture 375, such that the magnet 210 is spaced from the lower surface 392 of the disk 115. Nonetheless, the invention is not limited in this regard. For instance, a magnet 210 also can be spaced from the upper surface 125 of the disk 115. The magnet 210 can be a permanent magnet, such as a magnet formed of magnetic material. For example, the magnet 210 can be made of ferrite, neodymium, alnico, ceramic, and/or any other material that can be used to generate a magnetic field.

The magnet 210 also can be a non-permanent magnet, for example, an electromagnet. In another arrangement, the magnet can be a combination of one or more permanent magnets and one or more non-permanent magnets, for example, an electromagnet adjacent to one or more layers of magnetic material. As previously noted, the strength of the magnetic field generated by an electromagnet can be varied by varying the current through the conductor of the electromagnet, which can provide an additional means for controlling the amount of rotation of the disk 115.

In another exemplary embodiment, the fluid mixer 100 can be manufactured on a semiconductor substrate, for example on a silicon substrate using a polysilicon microfabrication process. Polysilicon microfabrication is well known in the art of micromachining. One such process is disclosed in David A. Koester et al., *MUMPs Design Handbook* (Rev. 7.0, 2001). An exemplary polysilicon microfabrication process is shown in FIGS. 4A-4I. It should be noted, however, that the invention is not limited to the process disclosed herein and that other semiconductor microfabrication processes can be used.

Referring to FIG. 4A, a first silicon substrate layer (first silicon layer) 402 can be provided to begin forming the fluid mixer structure 400, for example, a silicon wafer typically used in IC manufacturing. In some cases, it may be desirable for the first silicon layer 402 to have electrically insulating properties. Accordingly, the first silicon layer 402 can be formed without doping or have only a light doping.

A conductive layer, for example a layer of doped polysilicon or aluminum, can be deposited onto the first substrate layer 402. After deposition of the conductive layer, conductive circuit traces 404 can be defined using known lithography and etching techniques. In some cases it can be advantageous to deposit an insulating layer (not shown) such as silicon nitride (SiN) over the first silicon layer 402 prior to depositing the conductive layer used to form the conductive traces 404.

After the circuit traces are formed, an insulating layer 406 can be deposited onto the first silicon layer 402 using low pressure chemical vapor deposition (LPCVD). Inner vias 408, and outer vias 410 then can be formed in the insulating layer 406, for example using etching techniques. In the case that an insulating layer is provided over the circuit traces, the insulating layer also should be etched at the location of the vias 408, 410.

The inner vias 408 and outer vias 410 can be filled with electrically conductive material (e.g. aluminum) to electrically contact the circuit traces 404 at desired locations. Axial contact brushes 412 then can be deposited on inner vias 408 and radial edge contact brushes 414 can be deposited on outer vias 410 so that the contact brushes 412 and 414 are electrically continuous with the respective vias 408 and 410 and correlating circuit traces 404. Two axial contact brushes 412 and two radial edge contact brushes 414 are shown in the figure, but additional axial and radial edge contact brushes can be provided. Further, the contact brushes can include any conductive material suitable for use in a contact brush, for example, a carbon nano composite which can be applied using a thermo spray method commonly known to the skilled artisan. In another arrangement, the contact brushes can be a conductive liquid.

A first structural layer of polysilicon (poly 1 layer) 416 can be deposited onto the insulating layer 406 using LPCVD. The poly 1 layer 416 then can be etched to form a radial aperture 418, which exposes the contact brushes 412, 414. In an alternate arrangement, the aperture 418 region can be masked prior to application of the poly 1 layer 416, thereby preventing deposition in the aperture 418 region.

Referring to FIG. 4B, a first sacrificial layer 420, for example silicon dioxide ($SiO_2$) or phosphosilicate glass (PSG), can be applied to the substrate over the previously applied layers. The first sacrificial layer 420 can be removed at the end of the process. The sacrificial layer can be deposited by LPCVD and annealed to the circuit. Referring to FIG. 4C, the first sacrificial layer 420 then can be planarized within the aperture 418 using a planarizing etch-back process to form a flat base 422 within the aperture 418 that is recessed from an upper elevation 424 of the first sacrificial layer 420.

Referring to FIG. 4D, a conductor then can be deposited into the aperture 418 to form a disk (disk) 426 having opposing upper surface 428, a lower surface 430, an axial portion 432, and a radial edge portion 434. Further, the disk 426 can be wholly contained within the aperture 418 so that the only material contacting the disk 426 is the first sacrificial layer 420. The thickness of the disk 426 can be determined by the thickness of the first sacrificial layer 420 and the amount of etch-back. Importantly, mechanical characteristics, such as rigidity, should be considered when selecting a thickness for the disk 426.

Figure 4G:
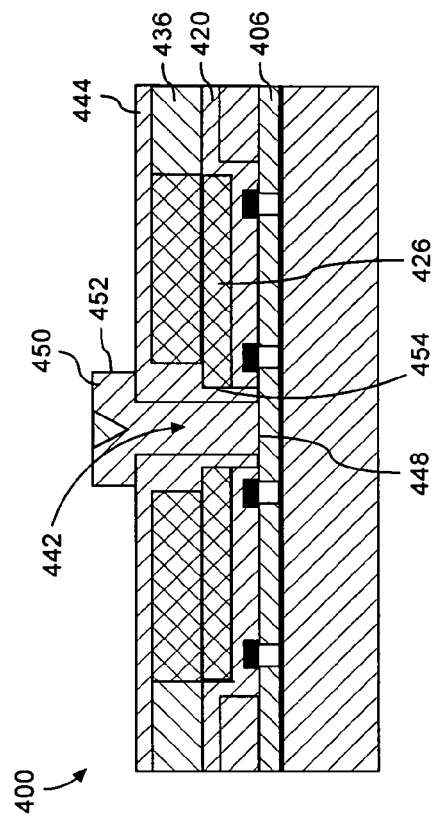
Figure 4H:
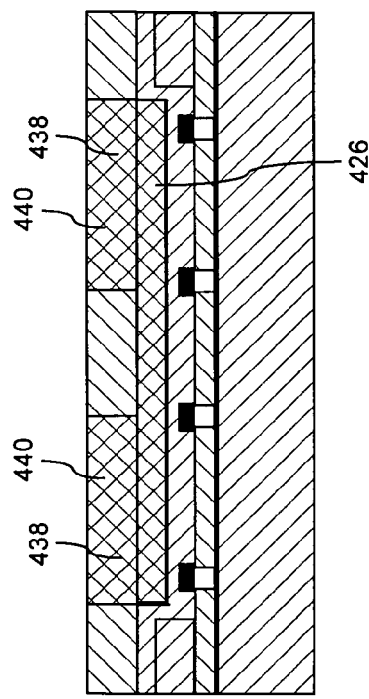
Figure 4E:
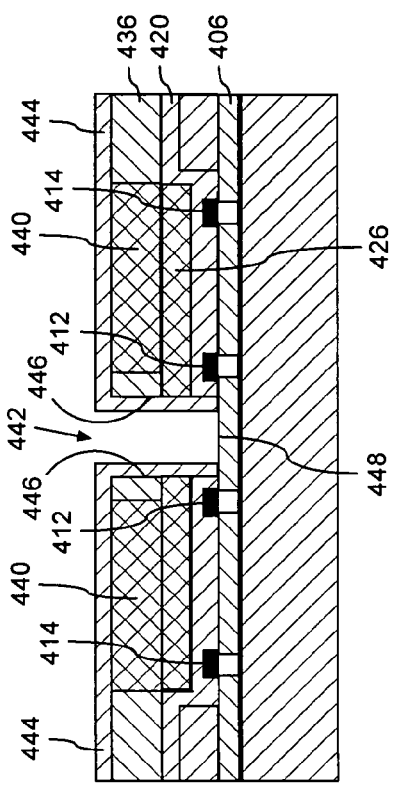
Figure 4F:
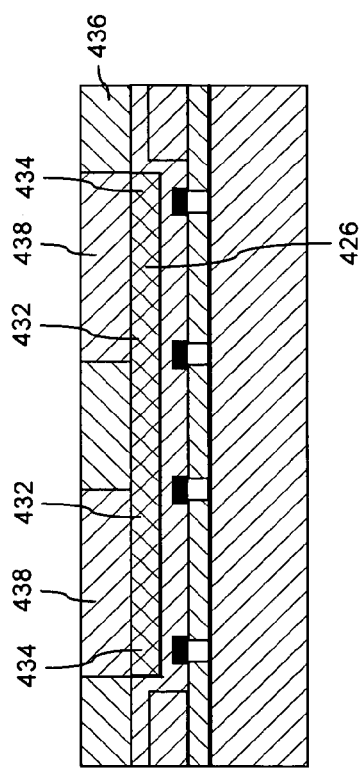

Referring to FIG. 4E, a second sacrificial layer 436 can be applied to the substrate over the previously applied layers. Again, the second sacrificial layer 436 can be deposited by LPCVD and annealed to the circuit and can be removed at the end of the process. Blade portions 438 of the sacrificial layer 436 can be etched away to expose regions of the disk 426 extending radially from the axial portion 432 of the disk 426 to the radial edge portion 434 of the disk 426. A conductor then can be deposited into the blade regions 438 to form blades 440 that are affixed to the disk 426, as shown in FIG. 4F.

Referring to FIG. 4G, an orifice 442 then can be etched through the inner region of the disk 426 and through the first and second sacrificial layers 420, 436, thereby exposing a region 448 of the insulating layer 406 below the center of the disk 426. Known etching techniques can be used, for example reactive ion etch (RIE), plasma etching, etc. Notably, the first orifice 442 can be sized to form a hole in the disk 426 having a radius equal to or smaller than the radial distance between opposing axial contact brushes 412, 414.

A third sacrificial layer 444 then can be applied over the disk 426, the blades 440 and over the radial wall 446 formed by the orifice 442. The region 448 of the insulating layer 406 should be masked during the application of the third sacrificial layer 444 to prevent the third sacrificial layer 444 from adhering to the insulating layer 406 in the region 448. Alternatively, a subsequent etching process can be performed to clear away the third sacrificial layer from the region 448.

Referring to FIG. 4H, using LPCVD, a second layer of polysilcon (poly 2 layer) 450 can be deposited over the previously applied layers, for example over the third sacrificial layer 444, thereby adding an additional silicon structure. Notably, the poly 2 layer 450 also can fill the orifice 442. Notably, the poly 2 layer 450 can be formed to have an outer radius 452 that is larger than an inner radius 454 of the disk 426. Accordingly, the poly 2 layer 450 can be formed to have a "T" shaped cross section extending upward from the region 448 of the insulating layer 406, thereby limiting vertical movement of the disk 426 once the sacrificial layers are removed. Further, the poly 2 layer can operate as a bearing around which the disk 426 can rotate. Alternatively, electromagnetic or electrostatic bearings can be provided in the first orifice 442.

The first, second and third sacrificial layers 420, 436, 444 then can be released from the fluid mixer structure 400, for example using a hydrogen fluoride (HF) solution. Such a process is known to the skilled artisan. For example, the fluid mixer structure 400 can be dipped in an HF bath. HF does not attack silicon or polysilicon, but quickly etches $SiO_2$. Notably, the HF can etch deposited $SiO_2$ approximately 100× faster than SiN.

Figure 4I:
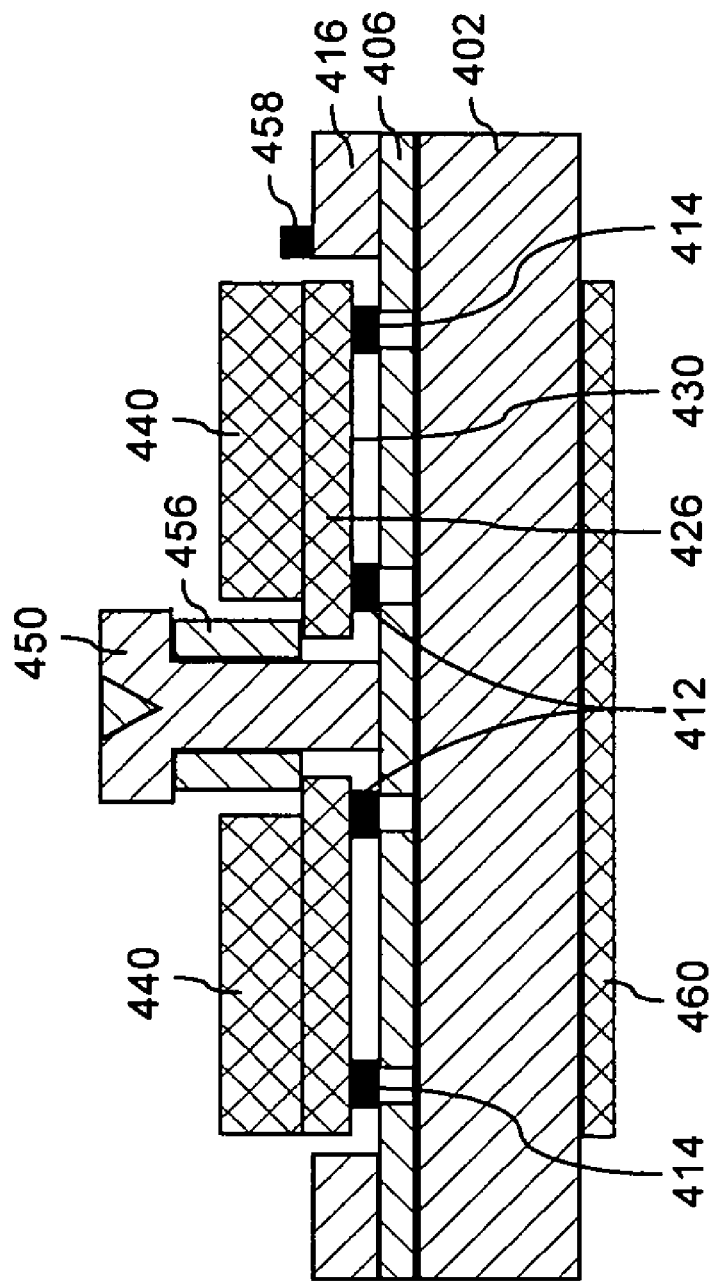

Referring to FIG. 4I, the release of the sacrificial layers enables the lower portion 430 of the disk 426 to rest upon, and make electrical contact with, the axial and radial edge contact brushes 412, 414. The disk 426, along with blades 440, then can be free to rotate about the axis of the disk. In one arrangement, a gasket 456 can be disposed between the T-shaped poly 2 layer 450 and the disk 426 to maintain the position of the disk 426 in contact with contact brushes 412, 414. For example, the gasket 456 can comprise a photodefinable polymer, such as a benzocyclobutene-based polymer, polyimide or SU-8. Such polymers are commercially available. For instance, SU-8 is commercially available from MicroChem Inc. of Newton, Mass. 02164. Teflon and Vespel, available from Dupont®, also are materials that can be used for the gasket 456.

In another arrangement, a framework with standoffs can be attached to the insulating layer 406 and/or the poly 1 layer 416. The standoffs can to maintain the position of the disk 426 in contact with contact brushes 412, 414. The standoffs can comprise a photodefinable polymer, Teflon, or Vespel. Additionally, the framework can be perforated to allow fluid flow. Alternatively, aerodynamic forces caused by rotation of the disk 426 and blades 440 can maintain the position of the disk 426 in contact with contact brushes 412, 414.

A magnet 460 can be fixed above and/or below the disk 426 to provide a magnetic field aligned with the axis of rotation of the disk 426. For example, the magnet 460 can be attached to the first substrate layer 402 below the disk 426. As previously noted, the magnet can be a permanent magnet, non-permanent magnets, or a combination of a permanent magnet and a non-permanent magnet. Also as noted, a sensor 458 also can be provided for monitoring rotational speed of the disk.

Figure 5:
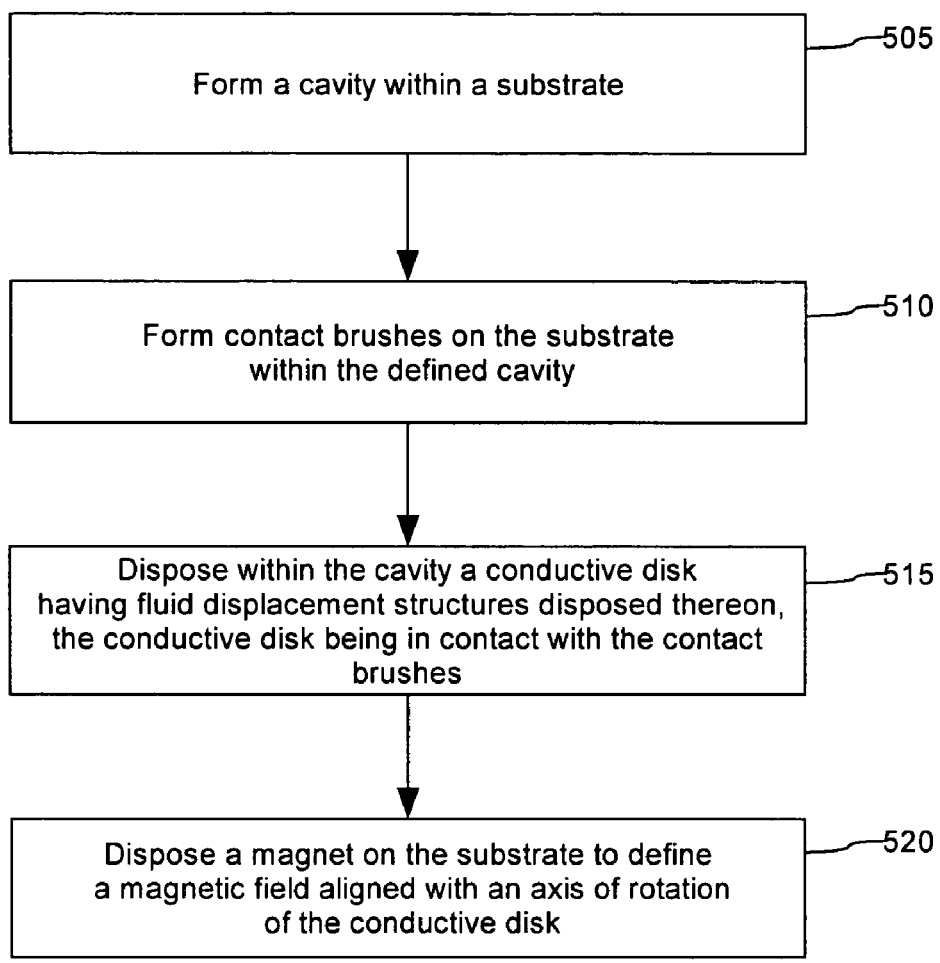
FIG. 5 is a flow chart that is useful for understanding the present invention.

A flow chart 500 which is useful for understanding the method of the present invention is shown in FIG. 5. Beginning at step 505, a cavity can be formed within the substrate. Proceeding to step 510, contact brushes can be formed on the substrate within the cavity. At least one contact brush can be disposed proximate to a central portion of the cavity and at least one contact brush can be disposed proximate to a radial edge portion of the cavity. Continuing at step 515, a conductive disk having an axial portion and a radial edge portion then can be disposed within the cavity. The conductive disk can have fluid displacement structures disposed thereon. The conductive disk can be disposed to make electrical contact with the contact brushes. Referring to step 520, a magnet can be disposed on the substrate to define a magnetic field aligned with an axis of rotation of the conductive disk.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method for displacing fluid comprising:
   positioning within a fluid a rotatable disk having at least one fluid displacement structure disposed thereon; and
   applying a voltage across a central portion of the rotatable disk and a radial edge portion of the rotatable disk in the presence of a magnetic field substantially aligned with an axis of rotation of the rotatable disk.

2. The method according to claim 1 further comprising selectively controlling a rotational speed of the rotatable disk to vary a fluid displacement rate.

3. The method according to claim 2 wherein said step of selectively controlling a rotational speed further comprises controlling at least one of a voltage source and a current source applying the voltage across the rotatable disk.

4. The method according to claim 2 wherein said step of selectively controlling a rotational speed further comprises controlling a strength of the magnetic field.

5. The method according to claim 1 further comprising selecting a blade to be the fluid displacement member.

6. A method for displacing fluid comprising:
   positioning within a fluid a rotatable disk defined by a flat plate having an upper and lower surface;
   positioning at least one fluid displacement structure on one of said upper and lower surface; and
   applying a voltage across a central portion of the rotatable disk and a radial edge portion of the rotatable disk in the presence of a magnetic field substantially aligned with an axis of rotation of the rotatable disk.

7. The method according to claim 6 further comprising selectively controlling a rotational speed of the rotatable disk to vary a fluid displacement rate.

8. The method according to claim 7 wherein said step of selectively controlling a rotational speed further comprises controlling at least one of a voltage source and a current source applying the voltage across the rotatable disk.

9. The method according to claim 7 wherein said step of selectively controlling a rotational speed further comprises controlling a strength of the magnetic field.

10. The method according to claim 6 further comprising selecting a blade to be the fluid displacement member.

* * * * *